United States Patent [19]
Elliger et al.

[11] 3,919,432
[45] Nov. 11, 1975

[54] DETOXIFICATION OF JOJOBA MEAL

[75] Inventors: Carl A. Elliger, Berkeley; Anthony C. Waiss, Jr., Pinole; Albert N. Booth, Berkeley, all of Calif.

[73] Assignee: The United States of America as represented by the Secretary of Agriculture, Washington, D.C.

[22] Filed: Aug. 16, 1974

[21] Appl. No.: 498,163

[52] U.S. Cl. .......... 426/319; 426/622; 426/629; 426/630; 426/635
[51] Int. Cl.² .......... A23B 9/00
[58] Field of Search .......... 426/319, 372, 373, 374, 426/377, 622, 629, 630, 635

[56] References Cited
UNITED STATES PATENTS

| | | | |
|---|---|---|---|
| 2,458,680 | 1/1949 | Buxton | 426/319 X |
| 3,391,000 | 7/1968 | Mustakas et al. | 426/373 X |
| 3,392,026 | 7/1968 | Mustakas et al. | 426/319 |
| 3,429,709 | 2/1969 | Masri et al. | 426/319 |
| 3,689,275 | 9/1972 | Espoy | 426/373 X |

*Primary Examiner*—Robert L. Lindsay, Jr.
*Assistant Examiner*—Arthur L. Corbin
*Attorney, Agent, or Firm*—M. Howard Silverstein; Max D. Hensley; William Takacs

[57] ABSTRACT

The toxicity of jojoba meal can be reduced by exposing the meal to ammonia for 25-35 days in a gas tight container. Thus, the meal becomes a valuable feed for ruminants and other animals.

1 Claim, No Drawings

DETOXIFICATION OF JOJOBA MEAL

DESCRIPTION OF THE INVENTION

This invention relates to and has among its objects the detoxification of jojoba meal so that it may be consumed as a feed without deleterious effects. Further objects of the invention will become evident from the following description wherein parts and percentages are by weight unless otherwise specified.

The jojoba plant or shrub grows mainly in the southwestern United States and in northwestern Mexico. Jojoba seeds are relatively large and contain a considerable proportion (approximately 50%) of oil or liquid wax. Numerous and diverse potential uses have been proposed for jojoba oil including high-temperature lubricants, treatment of leather, soap-making, dietetic salad oil, cosmetics and hair oils, resins, plasticizers, and so forth. Perhaps its most important use, however, is as a substitute for sperm whale oil, an extremely useful and valuable substance to industrialized societies. Recently, interest in jojoba oil as a sperm whale oil substitute has increased for several reasons, all of which revolve around a shortage of sperm whale oil. This shortage has become especially acute because the sperm whale has been placed on the Endangered Species list. Consequently, importation of sperm whale oil into the United States has been banned.

Jojoba meal is the residue produced when the oil is separated from the seed. Unfortunately, jojoba meal cannot (and will not) be consumed by ruminants and other animals because it is toxic. In other words, animals which eat jojoba meal die. As a result, animals instinctively will not eat the meal. With the increased interest in jojoba oil there is an abundance of jojoba meal, which does contain protein and other valuable nutrients for the animal diet and, but for its toxicity, would be a valuable animal feed.

The invention described herein provides a means for obviating the problem outlined above. As a result of the invention jojoba meal can be treated so that its toxicity is substantially reduced. Thus, jojoba meal becomes valuable as an animal feed, primarily as feed for livestock.

In accordance with the process of the invention jojoba meal is treated with ammonia and thus becomes detoxified. Generally, the meal is contacted with 5 to 10% ammonia based on the weight of the meal. For best results the jojoba meal should contain about 20 to 25% water based on the weight of the meal. Contact between the meal and the ammonia should be maintained for 25 to 35 days.

Various methods of contacting the meal and the ammonia may be employed. For example, the meal can be treated with aqueous ammonium hydroxide to provide the correct amount of both ammonia and water. Following application of ammonium hydroxide the meal is contained in such a way as to avoid evaporation of ammonia. Thus the treated meal may be placed in a suitable container of plastic or other material that prevents gaseous flow. Alternately, the meal may be treated first with the appropriate amount of water and placed in a container. Then, gaseous ammonia can be applied to the wet, contained meal until the proper percentage is attained. It should be noted that other means of applying ammonia and water to the meal will be evident to those skilled in the art.

The primary advantage of the invention is its simplicity. Jojoba meal that is toxic to animals may be converted into a usable animal feed merely by applying ammonia in proper proportions.

A further advantage of the invention is that the meal is made more digestible by application of ammonia. Thus, in addition to detoxifying the meal, ammonia also raises its nutritional value. Consequently, use of the jojoba meal for animal feed is even more desirable.

Our investigations indicate that the compound responsible for the toxicity of jojoba meal has the structure (1)

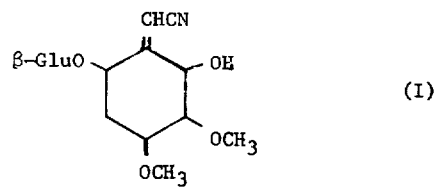

This compound readily undergoes rearrangement under alkaline conditions to the benzyl cyanide

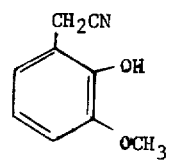

The latter compound is known to be toxic to animals.

Ammoniation promotes rearrangement of I, not to the benzyl cyanide, but to the corresponding amide

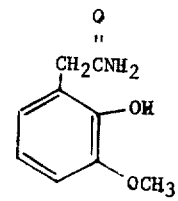

This amide is an extremely insoluble substance and most likely is excreted by the animal without any digestion whatsoever. In this way ammoniation substantially reduces the toxicity of jojoba meal. It should be noted, however, that the above hypothesis does not form any part of the invention and is provided only to further explain the process of the invention. The validity of the invention depends on the success of the ammonia treatment and not upon the correctness of the hypothesis.

EXAMPLE

The invention is further demonstrated by the following illustrative example.

A 100-gram sample of jojoba meal was placed in a stoppered glass bottle. Then, 30 ml. of 10 N ammonium hydroxide was added to the bottle, which then was stoppered to prevent escape of ammonia gas. Contact between the meal and ammonia was maintained for 30 days. Then, the bottle was opened, the meal was removed and the ammonia was allowed to evaporate.

The above experiment was repeated on two additional 100-gram samples of meal, one being held for 10 days, the other for five days.

The ammonia-treated meal was fed to rats (2 rats per group) at a level of 15% in a standard ration. As a control, untreated jojoba meal was also fed to the rats, again at a level of 15% in a standard ration. The feeding studies were continued for 5 days. Feed intake and weight gain were measured. The results are summarized in the following table.

| Run | Time of treatment of jojoba meal with ammonia, days | Results | | | |
|---|---|---|---|---|---|
| | | Group No. 1 | | Group No. 2 | |
| | | Feed intake (g) | Weight gain (g) | Feed intake (g) | Weight gain (g) |
| 1 | 30 | 52 | +20 | 45 | +13 |
| 2 | 10 | 42 | −3 | 42 | −4 |
| 3 | 5 | 31 | −6 | 30 | −17 |
| Control | 0 | 11 | −39 | 12 | −34 |

The results indicate not only that the rats eat more of the meal when jojoba meal is treated for 30 days with ammonia but also that such meal is conducive to gain in body weight.

It should be noted that the rats would not eat pure, untreated jojoba meal. When the rats were forced to eat this meal, they died soon thereafter.

Having thus described our invention, we claim:

1. A process for reducing the toxicity of jojoba meal which is contaminated with the sole toxic compound (I) 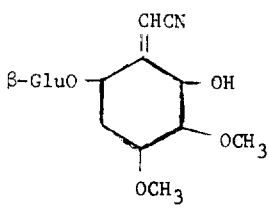

which comprises applying to the meal 5 to 10% of ammonia based on the weight of the meal and 20 to 25% of water based on the weight of the meal, and holding the so-treated meal for a period of 25 to 35 days in a gas-tight container whereby to promote rearrangement of said Compound I into the compound

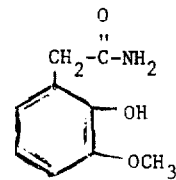

* * * * *